United States Patent
Brailovskiy et al.

(10) Patent No.: US 9,842,254 B1
(45) Date of Patent: Dec. 12, 2017

(54) CALIBRATING INERTIAL MEASUREMENT UNITS USING IMAGE DATA

(71) Applicant: Amazon Technologies, Inc., Seattle, WA (US)

(72) Inventors: Ilya Vladimirovich Brailovskiy, Mountain View, CA (US); Ilia Vitsnudel, Yehuda (IL)

(73) Assignee: Amazon Technologies, Inc., Seattle, WA (US)

(*) Notice: Subject to any disclaimer, the term of this patent is extended or adjusted under 35 U.S.C. 154(b) by 255 days.

(21) Appl. No.: 14/868,134

(22) Filed: Sep. 28, 2015

(51) Int. Cl.
 H04N 5/00 (2011.01)
 G06K 9/00 (2006.01)
 G06T 7/20 (2017.01)
 H04N 5/225 (2006.01)
 H04N 7/18 (2006.01)

(52) U.S. Cl.
 CPC .......... G06K 9/00577 (2013.01); G06T 7/20 (2013.01); H04N 5/2252 (2013.01); H04N 7/181 (2013.01); G06K 2009/00583 (2013.01)

(58) Field of Classification Search
 CPC ......... G06T 7/20; G03B 15/041; H04N 5/247
 USPC ....................................................... 348/159
 See application file for complete search history.

(56) References Cited

U.S. PATENT DOCUMENTS

2011/0206236 A1* 8/2011 Center, Jr. .............. G06T 7/269
  382/103

* cited by examiner

*Primary Examiner* — Jeffery Williams
(74) *Attorney, Agent, or Firm* — Lee & Hayes, PLLC

(57) ABSTRACT

The systems and/or processes described herein may calibrate an inertial measurement unit (IMU) of an electronic device in part by using images captured by one or more cameras of the electronic device. In this regard, an IMU of an electronic device may comprise a gyroscope, an accelerometer, a magnetometer, or any other type of motion sensor or rotational sensor.

20 Claims, 8 Drawing Sheets

US 9,842,254 B1

CALIBRATING INERTIAL MEASUREMENT UNITS USING IMAGE DATA

BACKGROUND

Electronic devices are ubiquitous in today's society. People use tablet computing devices, mobile phones, electronic book readers, laptop computers, and the like for an array of recreational and/or work-related activities. More and more, these devices include increasing amounts of sensors, such as still-image cameras, video cameras, gyroscopes, accelerometers, global positioning system (GPS) units, and the like, all of which capture or generate data for use by applications stored on the devices. In order for the sensors to be most effective, these sensors are calibrated to ensure their accuracy. While these sensors are typically calibrated in the factory prior to delivery to retailers and users, over time these sensors may experience drift, thus lessening the accuracy and/or precision of their measurements.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
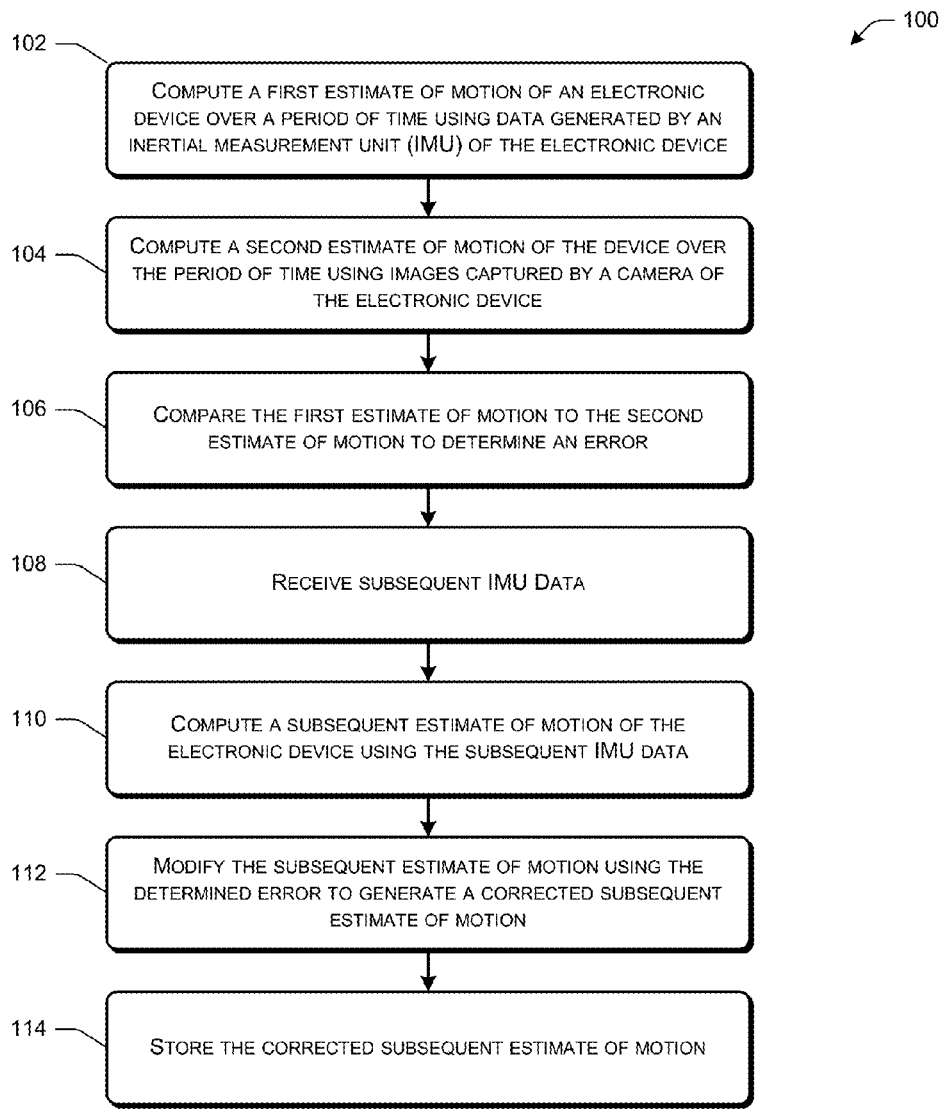
FIG. 1 illustrates an example process for calibrating an inertial measurement unit (IMU) of an electronic device in part by using images captured by a camera of the electronic device.

The systems and/or processes described herein may calibrate an inertial measurement unit (IMU) of an electronic device in part by using images captured by one or more cameras of the electronic device. In this regard, an IMU of an electronic device may comprise a gyroscope, an accelerometer, a magnetometer, or any other type of motion sensor or rotational sensor. In some instances, an IMU may comprise a single one of these devices (e.g., a single gyroscope or a single accelerometer), while in other instances the IMU may comprise a combination of these sensors (e.g., three gyroscopes and three accelerometers). In either case, the IMUs described herein may be configured to generate data describing motion, which may be expressed in terms of angular velocity, rotation and translation, a motion vector having a direction and magnitude, or the like.

In some instances, the electronic device that includes the IMU may further include one or more cameras at respective known locations on the device relative to the IMU. For instance, the electronic device may comprise a video-capture device having multiple cameras configured to capture panoramic (e.g., 360°) images about the device. In one specific example, the device may comprise four cameras arranged around a perimeter of a body of an electronic device, with an IMU residing within the device. Logic executing on the device, or remotely from the device, may be configured with information regarding a location of each camera relative to the IMU.

In some instances, the device comprises a mobile device that may be subject to movement, such as a user carrying the device, the device being attached to a vehicle that is moving, the device "flying" in a drone-like fashion, or the like. In these instances, the IMU may generate motion data indicative of motion of the device over a period of time. Furthermore, the logic may use this motion data and the information regarding the location of each camera on the device to determine how each individual camera has moved (at least according to the IMU) over the period of time. In some instances, the logic generates a motion vector for each of the cameras based on the IMU motion data and the known location of the respective camera, with the motion vector representing both a direction of movement and a magnitude. In other instances, meanwhile, the logic generates an indication of angular velocity of the camera over the period of time. In each of these cases, the logic may output and store motion data for each of the cameras, such as for each of the four cameras in the example video-capture device discussed above.

After storing this motion data for each camera, the logic may then attempt to determine the motion of each camera over the same period of time using images captured by the respective camera over the time period. To do so, the logic may implement known techniques, such as the Lucas-Kanade optical flow. Generally, the logic may analyze motion within images on a per-pixel or per-pixel-block basis. For instance, the images may be defined according to several hundred pixel blocks and movement of objects (i.e., the location of these objects) within these pixel blocks may be tracked across the images captured over the pertinent period of time. As such, a motion vector may be generated describing the motion of each block of one or more pixels over the period of time. The logic may then determine a motion vector most representative of the actual motion of the camera over the period of time. In some instances, the logic is configured to select a minimum motion vector from the potentially hundreds (or more or less) of motion vectors associated with the pixel blocks and may designate this minimum motion vector as representative of the motion of the camera over the period of time. In some instances, the "minimum motion vector" may represent a statistically reasonable minimum across multiple motion vectors, thereby taking into account that some of the motion vectors may represent invalid data or "noise". This reasonable minimum may represent an average of a certain amount of smallest motion vectors.

After determining the minimum motion vector for a first camera using the techniques described above, the logic may do the same for each camera of the electronic device. For instance, in the example where the device comprises the video-capture device having four cameras, the logic may determine motion vectors for blocks of pixels of each camera using the respective sets of images captured by the respective camera over the period of time. The logic may then select a minimum motion vector for each of the cameras. At this point, the logic may now have output and stored: (i) motion data representing movement of each camera as determined using information generated by the IMU and information regarding the location of the respective camera relative to the IMU, and (ii) motion data representing movement of each camera as determined by analyzing images captured by the respective camera.

Now, the logic may attempt to determine differences between the motion measured by the IMU and the motion deduced from the one or more cameras of the device. To do so, the logic may first compare the motion data representing movement of a first camera as determined using the information generated by the IM to motion data representing movement of the first camera determined by analyzing images captured by the camera. In some instances, this may involve comparing motion vectors, while in other instances this may involve comparing angular velocities or another representation of movement over the period of time. In either instance, this comparison results in generating an error (or measurement difference) between the two. In instances where the motion data comprises motion vectors, the error may represent a difference in direction and/or magnitude between the two motion vectors. In instances, where the motion data represents angular velocities, the error may be expressed as a difference between these angular velocities.

After calculating an error between movement at the first camera measured by the IMU and movement at the first camera determined using the image data, the logic may compare this error to a threshold to determine whether this error is likely accurate or, if not, whether the error should be discarded. For instance, if the error is expressed as both a different direction and magnitude, the error may be discarded if the direction of the error is greater than a certain angle (e.g., 5°, 10°, 20°, etc.) and/or may be discarded if the two magnitudes differ by more than some percentage (e.g., 5%, 10%, 20%, etc.). Again, if the error is greater than the threshold—potentially meaning that the measured difference in motion is too great to be trusted—then the error may be discarded. If, however, the error is less than the threshold, then the error may be stored for later use. In one example, this error may be used to later "correct" motion data generated by the IMU. That is, when the IMU generates subsequent motion data indicative of movement of the device over a subsequent period of time, the logic may modify this motion data using the error determined above. Thus, the resulting calculated movement of the device for the subsequent period of time may in fact be more accurate than the initial calculated movement prior to the modification.

In other instances, meanwhile, the logic may reference motion data for other cameras of the device prior to determining that the calculated error should later be used to correct subsequent motion data generated by the IMU. For instance, the logic may repeat the process above for a second camera of the device. That is, the logic may compare a motion vector (or angular velocity) for the second camera as determined using the motion data from the IMU to a motion vector (or angular velocity) for the second camera as determined by analyzing images captured by the second camera. This comparison results in a second error, which again may be compared against the threshold and discarded if larger than the threshold. If it is smaller than the threshold, however—meaning that it is generally in agreement with the first calculated error—then it may confirm the general validity of the first calculated error. At this point, the first calculated error or the second calculated error may be designated for later use to correct subsequent motion data generated by the IMU. In some instances, the smaller of the two errors may be selected.

If the second error had been larger than the threshold, and hence discarded, the logic may continue to subsequent cameras until an error is found that is less than the threshold and, hence, in general agreement with the first error. At this point, the logic may cease and the smaller of the two calculated errors may be used to correct subsequent motion data generated by the IMU. In other instances, meanwhile, the logic may continue to calculate an error for each camera, throwing out those errors that are larger than the threshold. After identifying a set of errors that are smaller than the threshold, meanwhile, the logic may select a smallest of these errors for later use when correcting subsequent motion data generated by the IMU. For instance, using ht example of an electronic device with four cameras, an error associated with each camera may be determined and the smallest error may be selected for use in correcting subsequent motion data generated by the IMU (assuming this error is less than the threshold).

FIG. 1 illustrates an example process 100 for calibrating an IMU of an electronic device in part by using images captured by a camera of the electronic device. The process 100 may be performed locally on a device that includes the IMU and the camera, remotely from the device, or a combination thereof. Further, each process described herein is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At 102, the process 100 computes a first estimate of motion the electronic device over a period of time using data generated by the IMU. That is, the IMU may output data indicative of motion of the device, and the process 100 may compute a motion vector or an angular velocity representative of motion of the device using this information, potentially along with information indicating a location of the camera on the device relative to the IMU.

At 104, the process 100 computes a second estimate of motion of the electronic device over the period of time by analyzing images captured by the camera over the period of time. As discussed above, this may include designating blocks of pixels, tracking objects within each respective pixel block through the images to generate a respective motion vector, and finding the minimum motion vector from the pixel-block motion vectors. This minimum motion vector may be designated as the second estimate of motion.

At 106, the process 100 compares the first estimate of motion to the second estimate of motion to generate an error—or simply a difference there between. As discussed above, the IMU motion data may be converted from angular velocity to a motion vector in some instances to allow for this comparison, while in other instances the minimum motion vector found by analyzing the images of the camera may be converted to an angular velocity to allow for the comparison. That is, as described below, the Lucas-Kanade optical flow may be used to determine a motion vector for the camera over a period of time, and this motion vector may be converted to an angular velocity using known math, to allow for comparison of the angular velocity determined from the IMU data. Regardless of whether the IMU data is converted from angular velocity to a motion vector, or whether the camera motion vector is converted to angular velocity, these measurements may be compared to generate an error.

At 108, the process 100 receives subsequent IMU motion data (indicative of movement of the device over a subsequent period of time) is received. At 110, the process 100 computes a subsequent estimate of motion of the device of the subsequent period of time using the subsequent IMU data. At 112, the process then modifies this subsequent estimate of motion using the error generated at 106 to generate a corrected subsequent estimate of motion. At 114, the process then stores the corrected subsequent estimate of motion, which may be used by applications on the electronic device for an array of purposes.

In some instances, this calibration process may repeat. For instance, because the IMU may be subject to drift, this recalibration process 100 may occur periodically (e.g., every 20 seconds, every hour, every day, etc.), randomly, or in response to a trigger (e.g., in response to an application requesting device-movement information).

Figure 2:
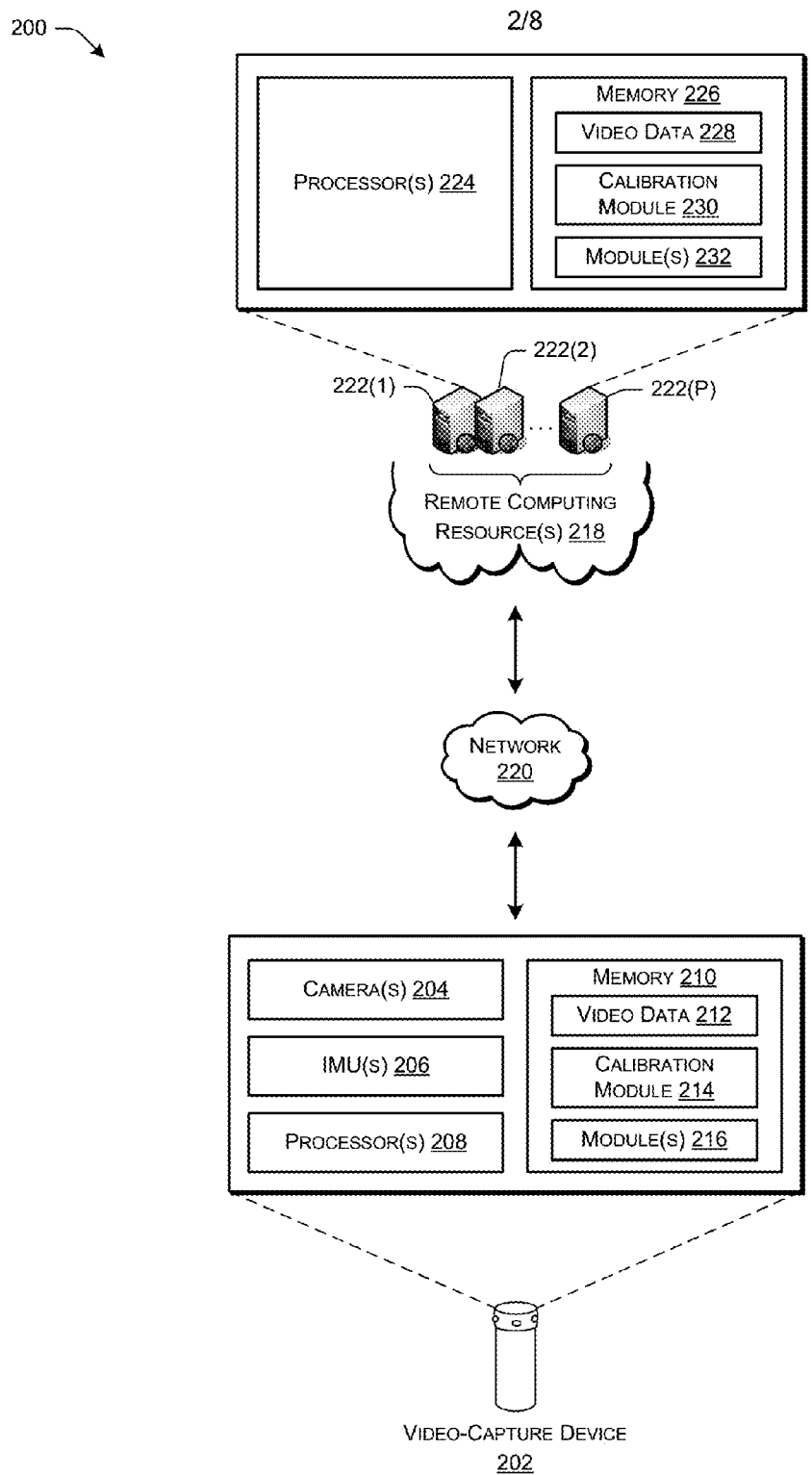
FIG. 2 illustrates an example system that includes a video-capture device, which may include the IMU and the camera discussed with reference to FIG. 1, as well as remote computing resources accessible to the device over a network. In this system, one or both of the device and the remote computing resources may perform the IMU calibration processes described herein.

FIG. 2 illustrates an example system 200 that includes a video-capture device 200, which may include the IMU and the camera discussed with reference to FIG. 1, as well as remote computing resources accessible to the device over a network. In this system 200, one or both of the device and the remote computing resources may perform the IMU calibration processes described herein.

In some instances, the video-capture device 202 is configured to acquire panoramic (e.g., 360°) still images or video of an environment in which the device resides. The device 202 may then provide this video to the remote computing resources, to one or more user devices, or the like. As illustrated, the device 202 includes one or more cameras 204, one or more IMUs 206, one or more processors 208, and memory 210. The memory 210 may store video data 212, a calibration module 214, and one or more other modules 216 that perform various operations.

For instance, in the example that the video-capture device 202 includes four different cameras, each of the four cameras may capture a different video stream corresponding to a field of view. The cameras 204 may be positioned on each side of the video-capture device 202, such that each camera is positioned 90° with respect to its adjacent cameras (e.g., cameras to the left and the right). That is, a first axis in which a first camera is oriented may be approximately 90° from a second axis in which adjacent cameras are oriented. Since the field of view of a first camera may overlap with the field of views of adjacent cameras, the multiple cameras of the video-capture device 202 may capture 360° of video. Moreover, instead of the video-capture device 202 including multiple cameras 204, the video-capture device 202 may capture 360° video using a single camera that rotates about the video-capture device 202 at a high rate/speed.

The cameras 204 of the video-capture device 202 may capture video data 212 of the environment surrounding the video-capture device 202. The video-capture device 202 may be set on a surface within an environment, which may allow the multiple cameras 204 to capture video of the environment. For instance, the video-capture device 202 may be set on a table within a room of a home to capture video of activity (e.g., a birthday party) taking place within the room. Due to multiple cameras 204 simultaneously capturing video, the video-capture device 202 may capture video in multiple different directions, thereby capturing video of an entirety of the events taking place within the room, provided that those events are within the field of view of at least one of the cameras 204. The video-capture device 202 may also be held by a user, or may be affixed the user in some manner (e.g., via a strap, a clip, a platform, etc.). Accordingly, as the user moves within an environment (e.g., a room, the beach, a hike in the mountains, etc.), the video-capture device 202 may capture video of events occurring within that environment. The cameras 204 may continuously capture video, or may begin/cease capturing video in response to user input (e.g., actuating a button, a voice command, etc.).

As stated above, the video data 212 may represent video captured by each of the multiple cameras 204 of the video-capture device 202. The one or more modules 216 of the video-capture device 202 may include software and/or other functionality that may stitch together the video data 212 captured by the multiple cameras 204. That is, provided that the video data 212 is captured by four different cameras 204, the modules 216 may stitch video data 212 captured by a first camera with the video data 212 captured by cameras adjacent to the first video camera. As a result, stitching of the video data 212 may result in stitched video data, where the stitched video data is 360° video that depicts the environment surrounding the video-capture device 202. The stitching of the video data 212 may also be performed by remote computing resources 218, or by a combination of the video-capture device 202 and the remote computing resources 218.

In other embodiments, the modules 216 may include speech recognition software or other speech recognition functionality. The video-capture device 202 may include one or more microphones that detect voice commands uttered by a user and that generate one or more audio signals corresponding to the voice commands. The speech recognition software may process the audio signals to recognize words included within the voice command. As a result, the video-capture device 202 may recognize voice commands uttered by the user (e.g., start recording video, stop recording video, take a photograph, etc.) and perform corresponding operations as a result (e.g., instruct the cameras 204 to record video, instruct the cameras 204 to cease recording video, instruct the cameras 204 to capture a still image, etc.). The video-capture device 202 may include one or more user interfaces (e.g., graphical user interfaces) and/or one or more speakers that allow the video-capture device to visually and/or audibly output information to the user, which may allow the user to interact with the video-capture device 202.

In addition to the above, the video-capture device may includes calibration module 214, which functions to calibrate the IMU 206 using information captured by the cameras 204. That is, the calibration module 216 may perform one or more of the processes described with reference to FIGS. 1, 3A-3C, 4, and 5, and/or variations thereof. In other instances, meanwhile some or all of these processes may be performed by the remote computing resources 218, as discussed below.

As illustrated, the video-captured device 202 may couple to the remote computing resource(s) 218 over a network 220. Also as illustrated, the remote computing resources 218 may be implemented as one or more servers 222(1), 222(2), . . . , 222(P) and may, in some instances, form a portion of a network-accessible computing platform implemented as a computing infrastructure of processors 224 and storage (e.g., memory 226) that is accessible via the network 220, such as the Internet. The remote computing resources 218 may not require end-user knowledge of the physical location and configuration of the system that delivers the services. Common expressions associated for these remote computing resources 218 may include "on-demand computing", "software as a service (SaaS)", "platform computing", "network-accessible platform", "cloud services", "data centers", and so forth.

As illustrated, the memory 226 may store video data 228, a calibration module 230, and one or more other modules 232 (e.g., some or all of the modules described above with reference to the modules stored on the video-capture device 102). In some examples, the video-capture device may upload the motion data from the IMU 206 and images captured by the cameras 204 to allow the calibration module 230 to perform the calibration process, given that the remote computing resources 218 may have a computational capacity that exceeds the computational capacity of the video-capture device 202. Therefore, the video-capture device 202 may utilize the functionality of the remote computing resources 218 for performing relatively complex analysis on video data 212 captured from the environment and/or on IMU-based motion data.

The video-capture device 202 and the remote computing resources 218 may communicatively couple to the network 220 via wired technologies (e.g., wires, USB, fiber optic cable, etc.), wireless technologies (e.g., RF, cellular, satellite, Bluetooth, etc.), or other connection technologies. The network 220 may be representative of any type of communication network, including data and/or voice network, and may be implemented using wired infrastructure (e.g., cable, CATS, fiber optic cable, etc.), a wireless infrastructure (e.g., RF, cellular, microwave, satellite, Bluetooth, etc.), and/or other connection technologies.

Figure 3A:
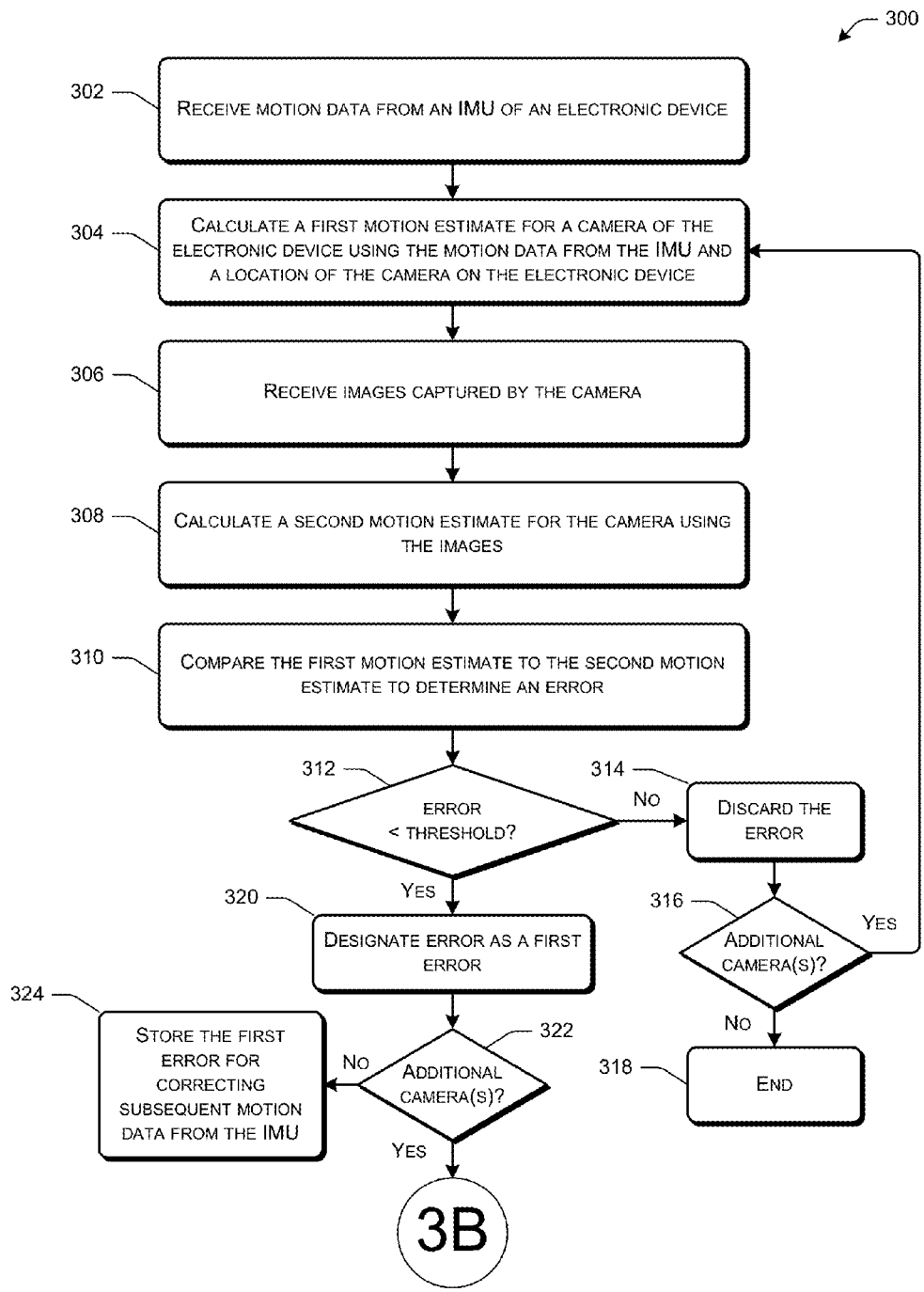
FIGS. 3A-3C collectively illustrate a flow diagram of an example process for calibrating an IMU of an electronic device in part by using images captured by a camera of the electronic device. In instances where the electronic device includes multiple cameras, the process may calculate motion using images from the multiple cameras to increase accuracy of the calibration process.
Figure 3B:
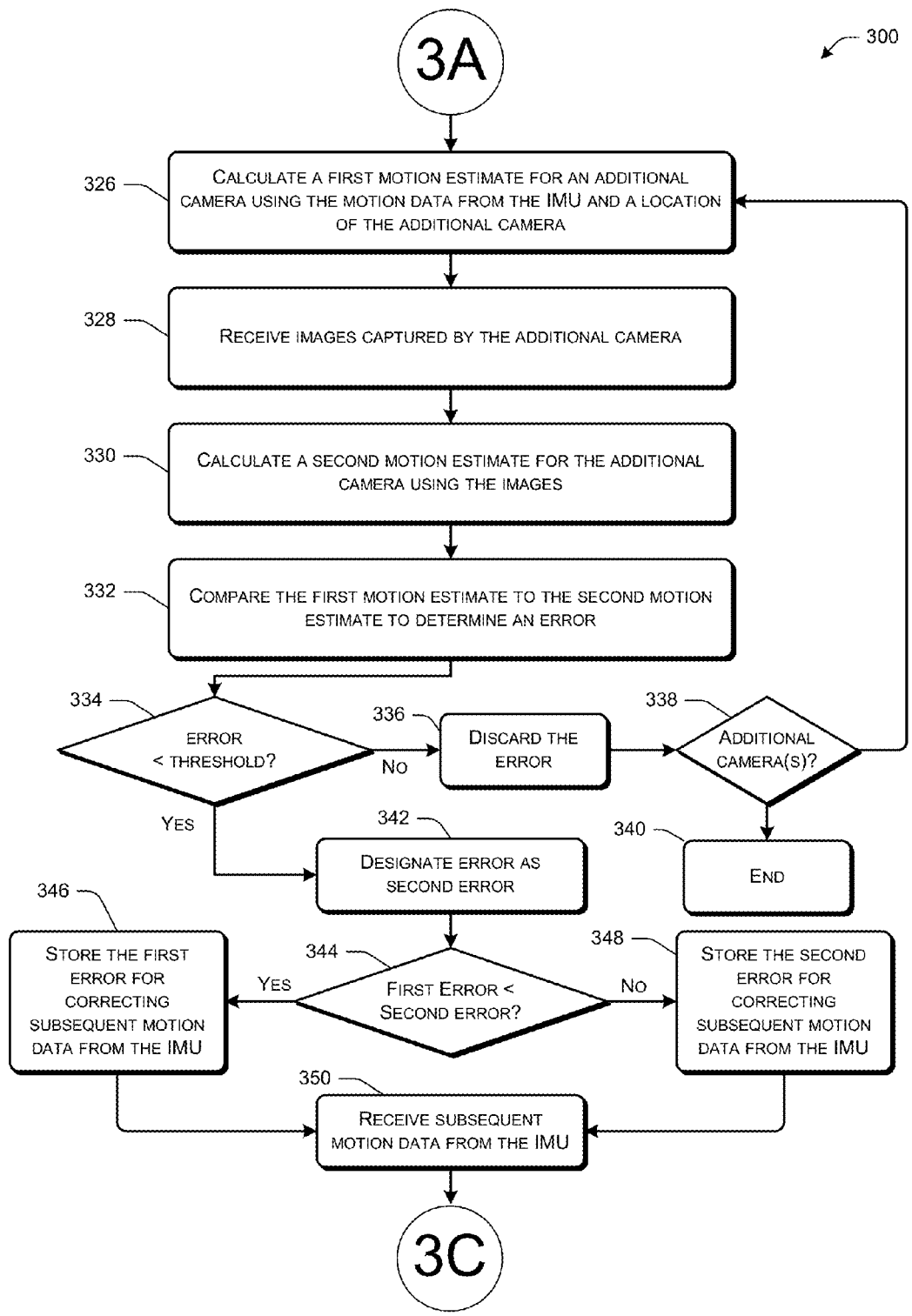
Figure 3C:
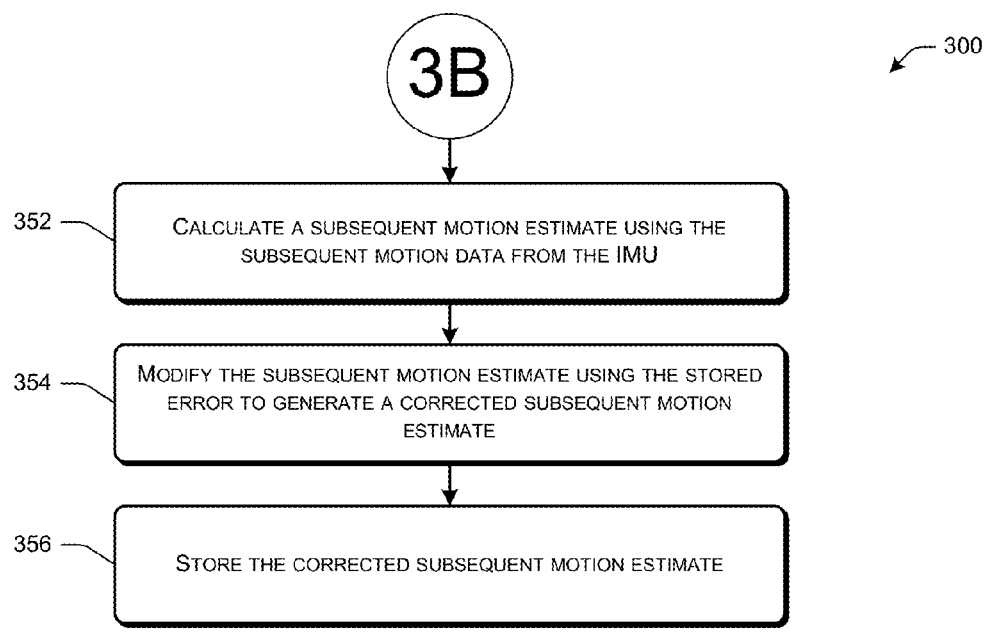

FIGS. 3A-3C collectively illustrate a flow diagram of an example process 300 for calibrating an IMU of an electronic device in part by using images captured by a camera of the electronic device. In instances where the electronic device includes multiple cameras, the process may calculate motion using images from the multiple cameras to increase accuracy of the calibration process. The process 300 may be performed by the calibration module 214, the calibration module 230, other components, and/or a combination thereof.

At 302, the calibration module receives motion data from an IMU of an electronic device, such as the video-capture device 202. In some instances, this motion data comprises three speed vectors in the X, Y, and Z direction ($V_1, V_2, V_3$) and three angular rotations representing pitch, roll, and yaw ($\alpha_1, \alpha_2, \alpha_3$). At 304, the calibration module calculates a first motion estimate for a camera of the device using the motion data from the IMU, as well as a known location of the camera on the device relative to the IMU. As described above and below, the first motion estimate may represent a motion vector (i.e., a direction and a magnitude measured in any suitable distance metric) or an angular velocity. Further, calculating motion based on motion data from the IMU may be performed using known math. When calculated in terms of a motion vector, the resulting motion vector may be represented as MV_Gyro($C_i,\theta,t$) where's $C_i$ represents the ith camera, $\theta$ represents the estimated gyro calibration drift, and t is time.

Figure 4:
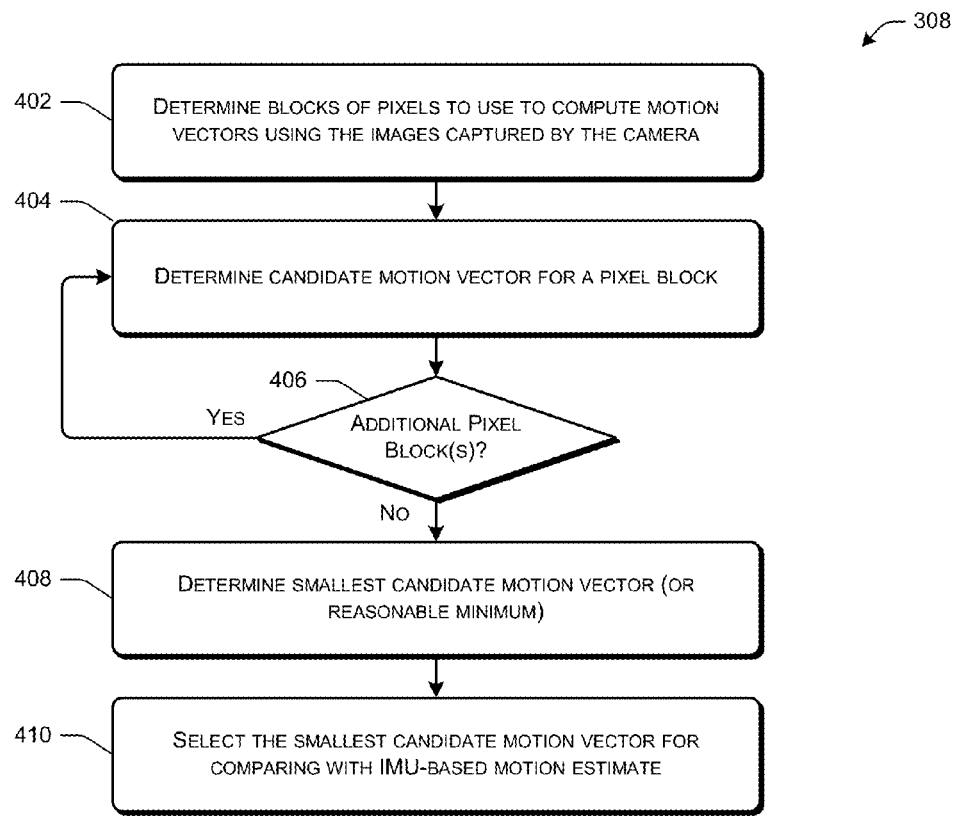
FIG. 4 illustrates a flow diagram of an example process for determining motion of an electronic device by analyzing images captured by a camera of the electronic device.

At 306, the calibration module receives images from the camera corresponding to the period of time that the motion data from the IMU is representative of. At 308, the calibration module calculates a second estimate of motion for the camera using these images. FIG. 4 illustrates this operation in further detail, and may represent use of a standard software calculation for deriving motion from optical data, such as the Lucas-Kanade algorithm. As shown at 402, the calibration module may first include determining blocks of pixels of the images to use for computing motion vectors using the images captured by the camera. At 404, the calibration module includes determining a candidate motion vector for a given pixel block by tracking objects through the images over time. That is, as a position of an object changes between the images, this positional change may be tracked for deriving motion of the camera itself. At 406, the calibration module determines whether there is an additional block of pixels for analyzing and, if so, the calibration module returns to 404 to calculate a candidate motion vector for that block. When a candidate motion vector has been calculated for each pixel block, at 410 the calibration module select the smallest candidate motion vector as the "second estimate of motion" for comparing with the IMU-based motion vector. As discussed above, in some instances the calibration module may comprise selecting or calculating a reasonable minimum value after discarding invalid candidate motion vectors.

In general, the minimum motion vector may correspond to objects within the images that are located at "infinity"—or the farthest objects within the images. To explain, envision that some objects within the images captured by the camera are very close to the camera—such as people within the images that are close to the camera—and other objects are far away from the camera—such as mountains in the background. When the motion for different pixel blocks is calculated, the close objects (e.g., the people) may appear to move across the images more rapidly than the far objects (e.g., the mountains) resulting in a higher estimate of motion. The minimum motion vector—representative of the calculated motion determined from the further objects (the objects at "infinity")—is more representative of the actual motion of the camera than motion vectors having higher values. As such, the motion estimate selected for the camera may correspond to the minimum motion vector (or a statistically reasonable minimum), which in turn corresponds to motion as determined by tracking objects at infinity across the images captured by the camera.

Returning to FIG. 3A, at 310 the calibration module compares the first estimate of motion to the second motion of estimate to determine an error—or simply a difference there between. That is, because camera and the IMU are both attached to a common electronic device, the resulting motion calculated for device should theoretically be the same (particularly after compensating for the location of the camera relative to the IMU). Therefore, any difference between the motion as sensed by the IMU and the motion as calculated by analyzing camera images is determined to be an error. In this disclosure, the motion calculated via analysis of the images will be assumed correct and used to correct the measurement recorded via the IMU.

At 312, the calibration module determines whether this error is less than a predefined threshold. A threshold is used because, as discussed above, the measurement estimates should generally agree since the camera and the IMU did in fact experience the same motion (as they both attached to a common electronic device). Therefore, if they do not generally agree (i.e., are not within the predefined threshold, such as within 10% of one another), then it is determined that one of the measurements is incorrect.

As discussed above, for motion vectors this may include ensuring that the difference between the directions of the two vectors are within a threshold amount of one another (e.g., within 10% of one another) and/or ensuring that the magnitude of the two vectors is within a threshold amount (e.g., within 10% of one another). In instances where the process 300 compares angular velocities (i.e., where the motion has been measured in angular velocities rather than motion vectors), however, the comparison may include determining whether or not the angular velocities are within a predefined threshold amount. For instance, the comparison may include determining whether or not value of the angular velocity measured by the IMU motion data is within, for instance, 10% of the value of the angular velocity measured by analyzing the images captured by the camera.

If the error is not less than the threshold, then at 314 the calibration module may discard the error and determine, at 316, whether the device includes one or more additional cameras having captured additional images that may be used to estimate motion of the device. If so, then the process returns to 304 to perform the analysis of operations 304 to 310 using the images captured by the additional camera. If not, then the process 300 may end at 318.

If, however, the calculated error is less than the threshold, then the process 300 may proceed to designating the error as a first error at 320. It is noted that designating an error as a "first error" (as described here) and designating an error as a "second error" (as described below) is only illustrated for clarity of the describing the process 300. That is, designating an error as the first error and another error as a second error is noted here so that these two errors may be described to be compared to one another (by name) later in the process 300.

At 322, the calibration module may determine whether the device includes one or more additional cameras having captured additional images that may be used to estimate motion of the device. If not, then at 324 the calibration module may store the first error for use in correcting subsequent motion data captured by the IMU. If it is determined at step 322 that the device includes one or more additional cameras, then the process 300 moves to FIG. 3B.

At 326, the process 300 proceeds to calculating, by the calibration module, a first motion estimate for an additional camera using the motion data from the IMU and a known location of the additional camera relative to the IMU. At 328, the calibration module receives images captured by the additional camera over the period of time corresponding to the motion data from the IMU. At 330, the calibration module calculates a second motion estimate for the additional camera using these images (e.g., using the process shown with reference to FIG. 4). At 332, the calibration module compares the first motion estimate for the first camera with the second motion estimate for the second camera to generate an error—or simply a difference there between.

At 334, the calibration module determines whether this error is less than the threshold. If not, then at 336 the calibration module discards the error and, at 338, determines whether the device has still one or more additional cameras having additional images that may be analyzed and have been yet to be analyzed. If so, the process 300 returns to performing operations 326 to 332 for the images captured by the additional camera. If not, the process 300 may end at 340.

If, however, the error is less than the threshold (or after identifying an error for an additional camera that is less than the threshold), at 342 the calibration module designates the error as a second error. Having now found two errors that are both less than the threshold (meaning that the motion input from at least two cameras substantially matches the motion input from the IMU), it may be assumed that the motion data from the cameras and the IMU are generally accurate. At 344, the calibration module determines whether the first error is smaller than the second error, given that the smaller error may be used for correcting subsequent motion data generated by the IMU. If the first error is less than the second error, then at 346 the calibration module stores the first error for correcting the subsequent motion data from the IMU. If, however, the second error is smaller, then at 348 the calibration module stores the second error for correcting the subsequent motion data from the IMU. At 350, the calibration module receives subsequent motion data from the IMU indicative of motion of the device over a subsequent period of time.

FIG. 3C concludes the illustration of the process 300. At 352, the calibration module 300 calculates a subsequent motion estimate for the device using the subsequent motion data from the IMU. At 354, however, the calibration module modifies this subsequent motion estimate using the stored error (e.g., the first or the second error) to generate a corrected subsequent motion estimate. To do so, the calibration module may use a trained fuzzy logic classifier, a trained neural network, or the like to modify the calculated motion estimate using the previously determined error. That is, a fuzzy logic classifier or a neural network may be trained in known conditions such that, when trained, the fuzzy logic classifier or the neural network may receive a particular error and output a corrected motion estimate. For example, if the error (i.e., "gyro drift $\theta$") is calculated as motion vector, the fuzzy logic controller or neural network may create expert rules connecting delta $MV\_delta(C_i,t)=MV\_Gyro(C_i,\theta,t)-MV\_Inf(C_i,t)$, where $MV\_Gyro(C_i,\theta,t)$ represents the motion vector calculated from the IMU motion data and $MV\_Inf(C_i,t)$ represents the minimum motion vector calculated from the images.

Figure 5:
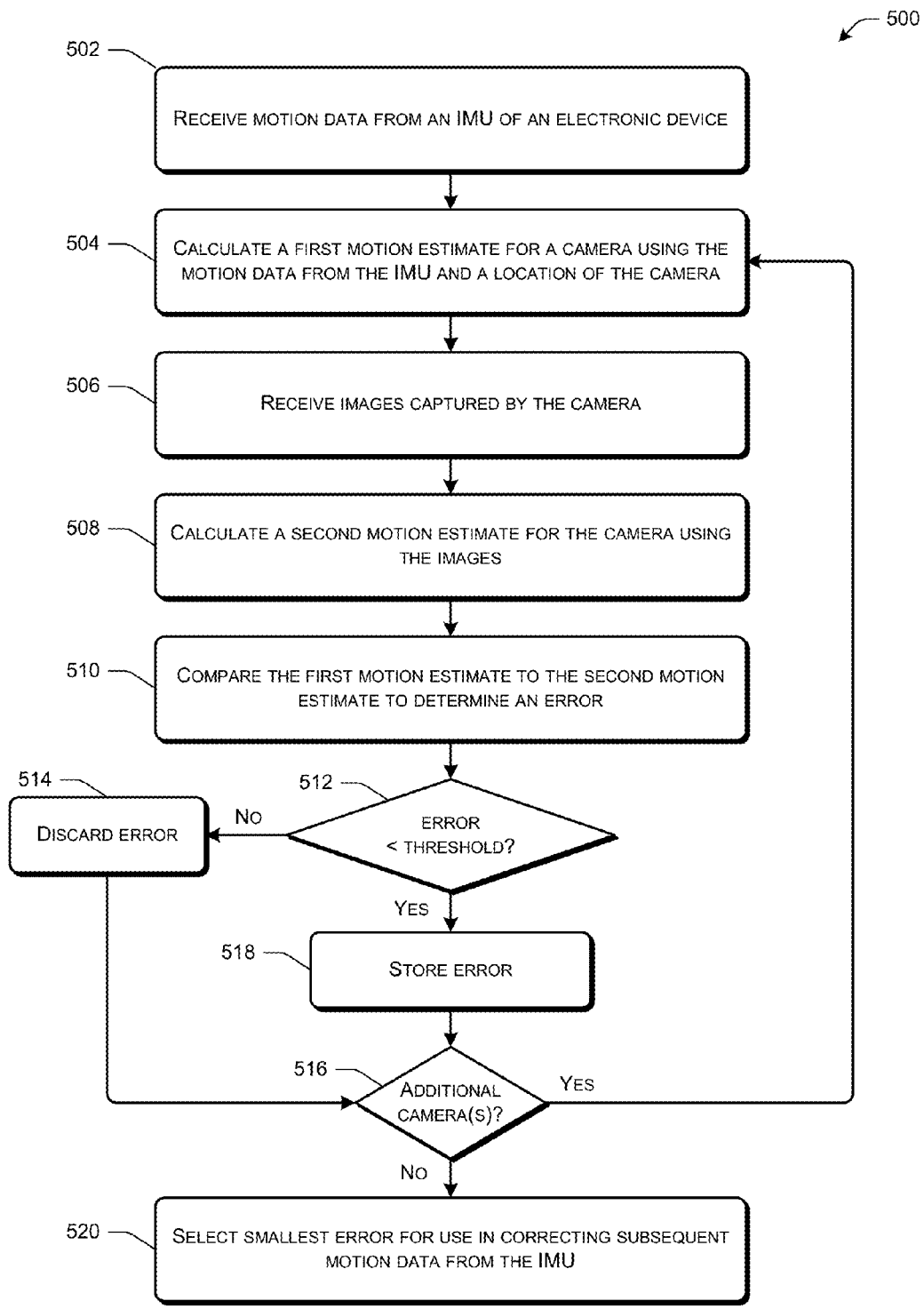
FIG. 5 illustrates a flow diagram of an example process for calibrating an IMU of an electronic device in part by using images captured by multiple cameras of the electronic device. In this example, the process determines an error between motion measured by the IMU and motion measured by each of the cameras, and selects the lowest error for correcting future motion data generated by the IMU.

FIG. 5, meanwhile, illustrates a flow diagram of an example process 500 for calibrating, by a calibration module or other component, an IMU by determining an error between motion measured by the IMU and motion measured by each of the cameras of the device. The calibration module then selects the lowest error for correcting future motion data generated by the IMU, as described below. While the process 500 may, in some instances, result in a more accurate error calculation, the process 500 may be more computationally intensive.

At 502, the calibration module receives motion data from the IMU of the device, indicative of motion of the device. At 504, the calibration module calculates a first motion estimate for a camera of the device using the IMU data and a known location of the camera relative to the IMU. At 506, the calibration module receives images captured by the camera and, at 508, calculates a second motion estimate for the camera using the images (e.g., using the process described with reference to FIG. 4). At 510, the calibration module compares the first motion estimate to the second motion estimate to determine an error—or simply a difference there between. At 512, the calibration module determines whether this error is less than a threshold. If not, then at 514 the calibration module discards the error and proceeds to determine whether the device includes an additional camera having captured images that may be used to estimate motion of the respective motion. If the error is indeed smaller than the threshold, however, then the calibration module stores the error at 518 and the process proceeds to the decision block 516.

Given the decision block 516, the process 500 repeats until an error has been calculated and either stored or discarded from each camera of the device having captured images during the period of time corresponding to the motion data generated by the IMU. Thereafter, at 520 the calibration module may select the smallest error from the set of these errors for correcting subsequent motion data generated by the IMU. As discussed above, this error may be used to correct subsequent motion data and, further, the calibration process 500 (and each calibration process described herein) may repeat periodically, randomly, or in response to a calibration trigger.

Figure 6:
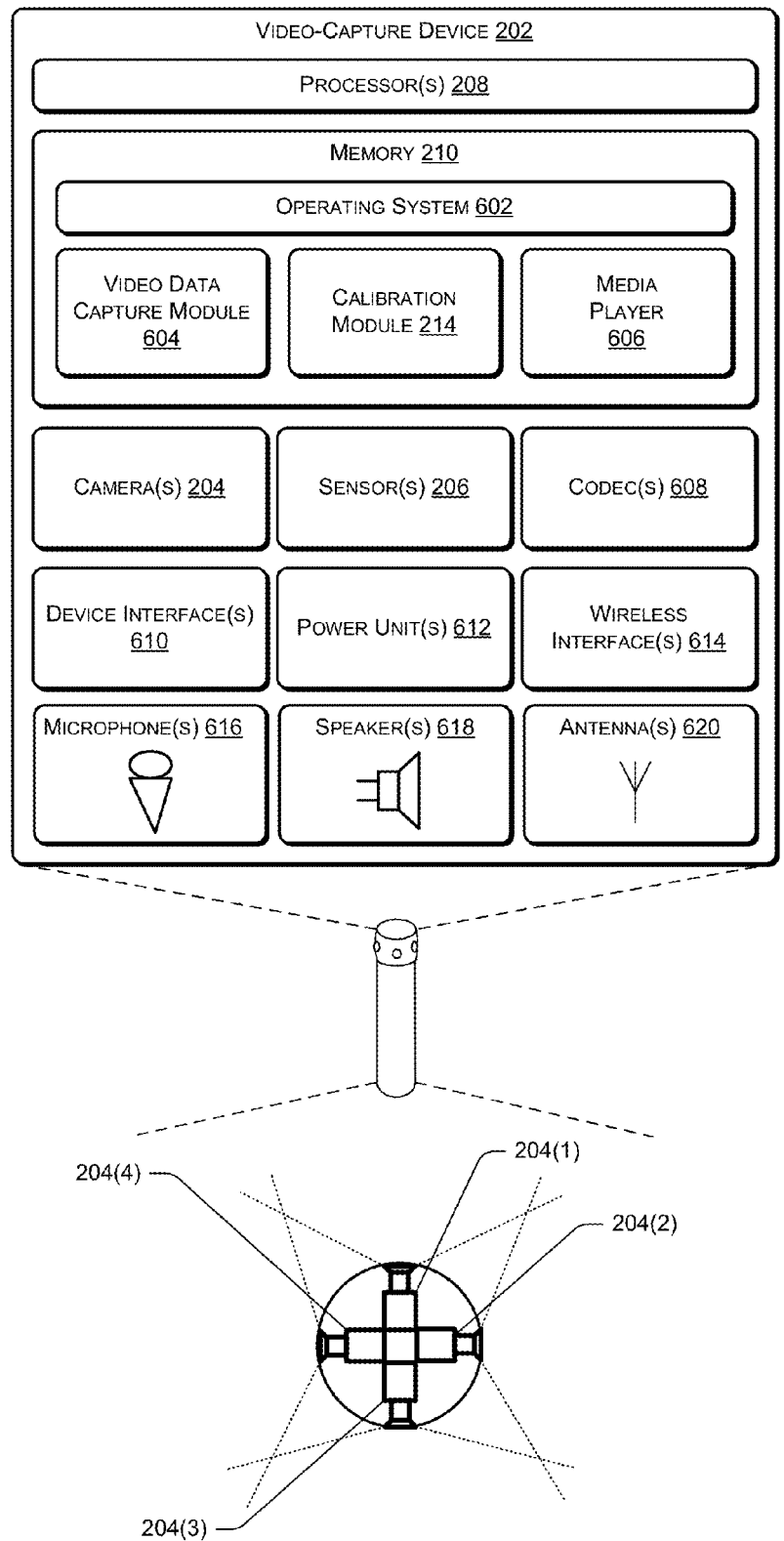
FIG. 6 illustrates an example device that includes an IMU, multiple cameras configured to capture video data, and logic for calibrating the IMU using video data captured by the cameras.

FIG. 6 shows selected functional components and/or modules of one implementation of the video-capture device 202 in additional detail. Generally, the video-capture device 202 may be implemented as a standalone device that may be relatively simple or complex in terms of functional capabilities with input/output components, memory, and processing capabilities. For instance, the video-capture device 202 may or may not have a keyboard, keypad, or other form of mechanical input in some implementations. The video-capture device 202 may or may not have a display or touch screen to facilitate visual presentation and user touch input. Moreover, the video-capture device 202 may be implemented with the ability to receive and output audio, video, and/or visual data, a network interface (wireless or wire-based), power, and processing/memory capabilities. As set forth above with respect to FIG. 2, the video-capture device 202 may include multiple cameras 204 that capture video data 212 that is used to generate panoramic images.

In the illustrated implementation, the video-capture device 202 may include the processor(s) 208 and the memory 210. In various embodiments, the processor(s) 208 may execute one or more modules and/or processes to cause the video-capture device 202 to perform a variety of functions, as set forth above and explained in further detail in the following disclosure. In some embodiments, the processor(s) 208 may include a central processing unit (CPU), a graphics processing unit (GPU), both CPU and GPU, or other processing units or components known in the art. Additionally, each of the processor(s) 208 may possess its own local memory, which also may store program modules, program data, and/or one or more operating systems. The processor 208 may include multiple processors 208 and/or a single processor 208 having multiple cores.

The memory 210 may include computer-readable storage media ("CRSM"), which may be any available physical media accessible by the processor(s) 208 to execute instructions stored on the memory 210. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor(s) 208. As will be discussed in additional detail, the memory 210 may include an operating system 602, a video data capture module 604 for capturing video data, the calibration module 214 and a media player 606.

In addition to the processor(s) 208 and the memory 210, the video-capture device 202 may include multiple cameras 204. For instance, as described in additional detail below, the video-capture device 202 may include four cameras 204 that are positioned on/within the video-capture device 202 90° from one another. Each of the multiple cameras 204 may capture video data 212, such as a video stream, within its corresponding field of view. As a result, by the four cameras 204 simultaneously capturing video, the video-capture device 202 may capture 360° of video surrounding the video-capture device 202. For the purposes of this discussion, the cameras 204 may include any type of camera (e.g., high definition (HD) camera) that is capable of capturing video and/or images (e.g., still images, panoramic images, etc.). Additionally, while this disclosure primarily discusses embodiments utilizing four cameras 204, it should be appreciated that some embodiments can utilize fewer (e.g., 1, 2, or 3) or more (e.g., 5, 6, 8, 10, and so on) cameras 204.

The video-capture device 202 may also include one or more sensors 206 (e.g., IMUs, etc.), codecs 608, device interfaces 610, power units 612, wireless interfaces 614, microphones 616, speakers 618, and antennas 620. For instance, the sensors 210 may include a motion sensor to determine/measure the motion and/or the velocity of motion (e.g., speed, rate, etc.) of the video-capture device 202, a location sensor (e.g., GPS sensor) to determine the position/physical location of the video-capture device 202, an inertial measurement unit (IMU) to determine the movement, velocity and/or orientation of the video-capture device (e.g., an accelerometer, a gyroscope and/or a magnetometer), an altimeter/altitude meter to determine the altitude of the video-capture device 202, a compass to determine the orientation/direction of the video-capture device 202, and/or any other type of sensor 210 utilized to determine the motion, velocity, acceleration, orientation, tilt, etc., of the video-capture device 202.

In addition, the video-capture device 202 may include one or more codecs 608 that are coupled to the microphone(s) 616 and/or the speaker(s) 618 to encode and/or decode audio signals generated by the microphone(s) 616. The codec(s) 608 may convert audio data and/or video data between different formats.

One or more device interfaces 610 (e.g., USB, broadband connection, etc.) may further be provided as part of the video-capture device 202 to facilitate a wired connection to a network, such as network 220, or a plug-in network device that communicates with other wireless networks. Moreover, one or more power units 612 may further be provided to distribute power to the various components of the video-capture device 202. The power unit(s) 612 may include hardware that enables the video-capture device 202 to be plugged into an outlet, thereby providing power to the video-capture device 202. Alternatively, or in addition, the power unit(s) 612 may correspond to one or more batteries (rechargeable or not) that may provide power to the video-capture device 202. Provided that the video-capture device 202 includes one or more batteries, the video-capture device 202 may be carried and used by the user while he/she moves between different locations.

In the illustrated example, the video-capture device 202 may include one or more wireless interfaces 614 coupled to one or more antennas 620 to facilitate a wireless connection to a network (e.g., network 220). The wireless interface 614 may implement one or more of various wireless technologies, such as Wi-Fi, Bluetooth, radio frequency (RF), and so on.

The video-capture device 202 may include a microphone unit that comprises one or more microphones 616 to receive audio input. The microphone(s) 616 of the video-capture device 202 may detect audio data from the environment, such as sounds uttered by the user and/or other ambient noise within the environment (e.g., birds chirping, waves crashing, voices, etc.). The microphones 616 may further generate audio signals that are representative of the audio data captured by the microphone(s) 220. In some embodiments, the microphone(s) 616 of the video-capture device 202 may detect audio commands uttered by the user, which may include audible instructions for the video-capture device 202 to power on, begin recording video, stop recording video, and so on. The video-capture device 202 may also include a speaker unit that includes one or more speakers 618 to output audio sounds. Such audio sounds may be responsive to the audio commands uttered by the user, or may provide various types of information to the user.

Therefore, the user of the video-capture device 202 may interact with the video-capture device 202 by speaking to it, and the microphone(s) 616 may capture sound and generate an audio signal that includes the user speech. The codec(s) 608 may encode the user speech and transfer that audio data to other components. The video-capture device 202 can communicate back to the user by emitting audible statements through the speaker(s) 618. In this manner, the user may interact with the video-capture device 202 simply through speech, without use of a keyboard or display common to other types of devices.

However, the video-capture device 202 may include other user interface (UI) components that enable user interaction with the video-capture device 202. For instance, the video-capture device 202 may include haptic input devices, such as navigation buttons, keypads, joysticks, keyboards, touch screens, and the like. Furthermore, the video-capture device 202 may include a display for text, graphical, or other visual output. The video-capture device 202 may also include non-input control mechanisms, such as basic volume control button(s) for increasing/decreasing volume, buttons to cause the cameras 204 of the video-capture device 202 to start and stop recording video data 212, buttons to adjust parameters (e.g., resolution, zoom, etc.) associated with the cameras 204, as well as power and reset buttons. There may also be one or more simple light elements (e.g., LEDs around perimeter of a top portion of the device 202) to indicate a state such as, for example, when power is on or to indicate that the video-capture device 202 is currently capturing video of the surrounding environment. Though, in some instances, the video-capture device 202 may not use or need to use any input devices or displays in some instances.

In various embodiments, the memory 210 of the video-capture device 202 may include the operating system 602. In some instances, the operating system 602 may be configured to manage hardware and services (e.g., device interface(s) 610, wireless interface(s) 614, codec(s) 608, etc.) within, and coupled to, the video-capture device 202 for the benefit of other modules. Moreover, the media player 606 may function to output any type of content on any type of output component of the video-capture device 202. For instance, the media player 606 may output audio via the speaker(s) 618 and/or video or other visual information via a display of the video-capture device 202. For instance, the user may interact (e.g., audibly, via other user input, etc.) with the video-capture device 202 to instruct the media player 606 to cause output of audio (e.g., audio of a video), and/or a video or an image captured by the cameras 204.

In addition, the memory 210 may include the video data capture module 604. In various embodiments, the video data capture module 604 may cause the multiple cameras 204 of the video-capture device 202 to capture video data 212 of the surrounding environment. That is, assume that the video-capture device 202 includes four different cameras 204—a first camera 204(1), a second camera 204(2), a third camera 204(3), and a fourth camera 204(4). The video data capture module 604, may cause the first camera to capture first video data 212, the second camera to capture second video data 212, the third camera to capture third video data 212, and the fourth camera to capture fourth video data 212. As a result, the video-capture device 202 may capture four, and possibly more, video streams simultaneously.

Due to the multiple cameras 204 of the video-capture device 202 having overlapping fields of view, a video stitching module (executed on the device 202 at the remote computing resources 218) may stitch together the video data 212 captured by the cameras 204 to generate stitched video data, where the stitched video data corresponds to 360° video. In various embodiments, the video-capture device 202 may transmit raw video data captured by the cameras 204 to the remote computing resources 218, which may then stitch the video data. In other instances, meanwhile, the video stitching module may reside on the video-capture device 202 such that the device 202 transmits the stitched video data to the remote computing resources 218 for additional processing.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. An electronic device, comprising:
   a body;
   a first camera at a first location on the body of the electronic device to capture a first set of images;
   a second camera at a second location on the body of the electronic device to capture a second set of images;
   an inertial measurement unit (IMU) to estimate motion of the electronic device;
   one or more processors; and
   one or more computer-readable media storing computer-executable instructions that, when executed, cause the one or more processors to perform acts comprising:
      receiving motion data from the IMU indicative of translation and rotation of the electronic device over a period of time;
      calculating, using the motion data from the IMU and data indicative of the first location of the first camera, a first motion vector for the first camera indicative of direction that the first camera moved over the period of time and a magnitude of movement of the first camera over the period of time;
      calculating, using the motion data from the IMU and data indicative of the second location of the second camera, a second motion vector for the second camera indicative of a direction that the second camera moved over the period of time and a magnitude of movement of the second camera over the period of time;

calculating, using the first set of images, a third motion vector for the first camera indicative of a direction that the first camera moved over the period of time and a magnitude of movement of the first camera over the period of time;

calculating, using the second set of images, a fourth motion vector for the second camera indicative of direction and magnitude of the second camera over the period of time;

comparing the first motion vector to the second motion vector to determine a first error representative of at least one of a difference in direction of the first motion vector and direction of the second motion vector or a difference in magnitude of the first motion vector and magnitude of the second motion vector;

comparing the third motion vector to the fourth motion vector to determine a second error representative of at least one of a difference in direction of the third motion vector and direction of the fourth motion vector or a difference in magnitude of the third motion vector and magnitude of the fourth motion vector;

receiving subsequent motion data from the IMU indicative of translation and rotation of the electronic device over a subsequent period of time;

calculating a subsequent motion vector for the electronic device using the subsequent motion data, the subsequent motion vector indicative of direction that the electronic device moved over the subsequent period of time and magnitude of movement of the electronic device over the subsequent period of time;

modifying the subsequent motion vector by inputting least one of the first error or the second error to at least one of a trained fuzzy logic controller or a trained neural network to generate a corrected subsequent motion vector; and storing the corrected subsequent motion vector.

2. The electronic device as recited in claim 1, the acts further comprising:

determining that the first error is less than a threshold;
determining that the second error is less than the threshold; and
determining that the first error is less than the second error;
and wherein the modifying the subsequent motion vector comprises modifying the subsequent motion vector using the first error to generate the corrected subsequent motion vector.

3. The electronic device as recited in claim 1, further comprising a third camera at a third location on the body of the electronic device to capture third set of images, and wherein the acts further comprise:

calculating, using the motion data from the IMU and data indicative of the third location of the third camera, a fifth motion vector for the third camera indicative of direction that that the third camera moved over the period of time and a magnitude of movement of the third camera over the period of time;

calculating, using the third set of images captured by the third camera, a sixth motion vector for the third camera indicative of direction that the third camera moved over the period of time and a magnitude of movement of the third camera over the period of time;

determining that the first error is less than a threshold;
determining that the second error is greater than the threshold;

comparing the fifth motion vector to the sixth motion vector for the third camera to determine a third error;
determining that the third error is less than the threshold; and
determining that the first error is smaller than the third error;
and wherein the modifying the subsequent motion vector comprises modifying the subsequent motion vector using the first error to generate the corrected subsequent motion vector.

4. The electronic device as recited in claim 1, wherein the calculating the second motion vector for the first camera comprises:

calculating a first candidate motion vector by determining how a location of a first group of pixels changed across images of the first set of images;
calculating a second candidate motion vector by determining how a location of a second group of pixels changed across images of the first set of images;
determining that a magnitude of the first candidate motion vector is smaller than a magnitude of the second candidate motion vector; and
selecting the first candidate motion vector as the second motion vector for the first camera.

5. A method comprising:

computing a first estimate of motion of an electronic device over a period of time using motion data generated by an inertial measurement unit (IMU) of the electronic device;
computing a second estimate of motion of the electronic device over the period of time using images captured by a camera of the electronic device;
comparing the first estimate of motion to the second estimate of motion to determine a difference;
computing a subsequent estimate of motion of the electronic device over a subsequent period of time using subsequent motion data generated by the IMU;
modifying the subsequent estimate of motion using the difference to generate a corrected subsequent estimate of motion; and
storing the corrected subsequent estimate of motion.

6. The method as recited in claim 5, wherein:

computing the first estimate of motion comprises computing a first of estimate of motion for a first camera of the electronic device using the motion data generated by the IMU and data indicative of a location of the first camera on the electronic device;
computing the second estimate of motion of the electronic device comprises computing a second estimate of motion for the first camera of the electronic device using the images captured by the first camera; and
the comparing comprises comparing the first estimate of motion for the first camera to the second estimate of motion for the first camera to determine a first difference;

and further comprising:

computing a first estimate of motion for a second camera of the electronic device over the period of time using the motion data generated by the IMU and data indicative of a location of the second camera on the electronic device;
computing a second estimate of motion for the second camera of the electronic device over the period of time using images captured by the second camera; and comparing the first estimate of motion for the second camera to the second estimate of motion for the second camera to determine a second difference.

7. The method as recited in claim 6, further comprising:
determining that the first difference is less than a threshold;
determining that the second difference is less than the threshold; and
determining that the first difference is less than the second difference;
and wherein the modifying the subsequent estimate of motion comprises modifying the subsequent estimate of motion using the first difference to generate the corrected subsequent estimate of motion.

8. The method as recited in claim 6, further comprising:
determining that the first difference is less than a threshold;
determining that the second difference is greater than the threshold;
computing a first estimate of motion for a third camera of the electronic device over the period of time using the motion data generated by the IMU and data indicative of a location of the third camera on the electronic device;
computing a second estimate of motion for the third camera of the electronic device over the period of time using images captured by the third camera;
comparing the first estimate of motion for the third camera to the second estimate of motion for the third camera to determine a third difference;
determining that the third difference is less than the threshold; and
determining that the first difference is less than the third difference;
and wherein the modifying the subsequent estimate of motion comprises modifying the subsequent estimate of motion using the first difference to generate the corrected subsequent estimate of motion.

9. The method as recited in claim 6, further comprising:
computing a first estimate of motion for a third camera of the electronic device over the period of time using the motion data generated by the IMU and data indicative of a location of the third camera on the electronic device;
computing a second estimate of motion for the third camera of the electronic device over the period of time using images captured by the third camera;
comparing the first estimate of motion for the third camera to the second estimate of motion for the third camera to determine a third difference;
computing a first estimate of motion for a fourth camera of the electronic device over the period of time using the motion data generated by the IMU and data indicative of a location of the fourth camera on the electronic device;
computing a second estimate of motion for the fourth camera of the electronic device over the period of time using images captured by the fourth camera;
comparing the first estimate of motion for the fourth camera to the second estimate of motion for the fourth camera to determine a fourth difference; and
determining that the first difference is less than each of the second difference, the third difference, and the fourth difference;
and wherein the modifying the subsequent estimate of motion comprises modifying the subsequent estimate of motion using the first difference to generate the corrected subsequent estimate of motion.

10. The method as recited in claim 5, wherein the computing the second estimate of motion comprises:
determining a first candidate estimate of motion by analyzing a first group of pixels of the images captured by the camera of the electronic device;
determining a second candidate estimate of motion by analyzing a second group of pixels of the images captured by the camera of the electronic device;
determining that the first candidate estimate of motion is less than the second candidate estimate of motion; and
selecting the first candidate estimate of motion as the second estimate of motion of the electronic device.

11. The method as recited in claim 5, wherein:
the computing the first estimate of motion of the electronic device over the period of time using the motion data generated by the IMU comprises computing a first estimated motion vector of the electronic device over the period of time, the first estimated motion vector comprising a first estimated direction of the electronic device over the period of time and a first estimated magnitude of the electronic device over the period of time;
the computing the second estimate of motion of the electronic device over the period of time using the images captured by the camera of the electronic device comprises computing a second estimated motion vector of the electronic device over the period of time, the second estimated motion vector comprising a second estimated direction of the electronic device over the period of time and a second estimated magnitude of the electronic device over the period of time; and
the comparing comprises at least one of:
comparing the first estimated direction to the second estimated direction to determine the difference; or
comparing the first estimated magnitude to the second estimated magnitude to determine the difference.

12. The method as recited in claim 5, wherein:
the computing the first estimate of motion of the electronic device over the period of time using the motion data generated by the IMU comprises computing a first estimated angular velocity of the electronic device over the period of time;
the computing the second estimate of motion of the electronic device over the period of time using the images captured by the camera of the electronic device comprises computing a second estimated angular velocity of the electronic device over the period of time; and
the comparing comprises comparing the first estimated angular velocity to the second estimated angular velocity to determine the difference.

13. A system comprising:
one or more processors; and
one or more computer-readable media storing computer-executable instructions that, when executed, cause the one or more processors to perform acts comprising:
computing a first estimate of motion of an electronic device over a period of time using motion data generated by an inertial measurement unit (IMU) of the electronic device;
computing a second estimate of motion of the electronic device over the period of time using images captured by a camera of the electronic device;
comparing the first estimate of motion to the second estimate of motion to determine an difference;

computing a subsequent estimate of motion of the electronic device over a subsequent period of time using subsequent motion data generated by the IMU;

modifying the subsequent estimate of motion using the determined difference to generate a corrected subsequent estimate of motion; and storing the corrected subsequent estimate of motion.

14. The system as recited in claim 13, wherein:

the computing the first estimate of motion comprises computing a first of estimate of motion for a first camera of the electronic device using the motion data generated by the IMU and data indicative of a location of the first camera on the electronic device;

the computing the second estimate of motion of the electronic device comprises computing a second estimate of motion for the first camera of the electronic device using the images captured by the first camera; and the comparing comprises comparing the first estimate of motion for the first camera to the second estimate of motion for the first camera to determine a first difference;

and the acts further comprising:

computing a first estimate of motion for a second camera of the electronic device over the period of time using the motion data generated by the IMU and data indicative of a location of the second camera on the electronic device;

computing a second estimate of motion for the second camera of the electronic device over the period of time using images captured by the second camera; and comparing the first estimate of motion for the second camera to the second estimate of motion for the second camera to determine a second difference.

15. The system as recited in claim 14, further comprising:

determining that the first difference is less than a threshold;

determining that the second difference is less than the threshold; and determining that the first difference is less than the second difference;

and wherein the modifying the subsequent estimate of motion comprises modifying the subsequent estimate of motion using the first difference to generate the corrected subsequent estimate of motion.

16. The system as recited in claim 14, further comprising:

determining that the first difference is less than a threshold;

determining that the second difference is greater than the threshold;

computing a first estimate of motion for a third camera of the electronic device over the period of time using the motion data generated by the IMU and data indicative of a location of the third camera on the electronic device;

computing a second estimate of motion for the third camera of the electronic device over the period of time using images captured by the third camera;

comparing the first estimate of motion for the third camera to the second estimate of motion for the third camera to determine a third difference;

determining that the third difference is less than the threshold; and determining that the first difference is less than the third difference;

and wherein the modifying the subsequent estimate of motion comprises modifying the subsequent estimate of motion using the first difference to generate the corrected subsequent estimate of motion.

17. The system as recited in claim 14, further comprising:

computing a first estimate of motion for a third camera of the electronic device over the period of time using the motion data generated by the IMU and data indicative of a location of the third camera on the electronic device;

computing a second estimate of motion for the third camera of the electronic device over the period of time using images captured by the third camera;

comparing the first estimate of motion for the third camera to the second estimate of motion for the third camera to determine a third difference;

computing a first estimate of motion for a fourth camera of the electronic device over the period of time using the motion data generated by the IMU and data indicative of a location of the fourth camera on the electronic device;

computing a second estimate of motion for the fourth camera of the electronic device over the period of time using images captured by the fourth camera;

comparing the first estimate of motion for the fourth camera to the second estimate of motion for the fourth camera to determine a fourth difference; and determining that the first difference is less than each of the second difference, the third difference, and the fourth difference;

and wherein the modifying the subsequent estimate of motion comprises modifying the subsequent estimate of motion using the first difference to generate the corrected subsequent estimate of motion.

18. The system as recited in claim 13, wherein the computing the second estimate of motion comprises:

determining a first candidate estimate of motion by analyzing a first group of pixels of the images captured by the camera of the electronic device;

determining a second candidate estimate of motion by analyzing a second group of pixels of the images captured by the camera of the electronic device;

determining that the first candidate estimate of motion is less than the second candidate estimate of motion; and selecting the first candidate estimate of motion as the second estimate of motion of the electronic device.

19. The system as recited in claim 13, wherein:

the computing the first estimate of motion of the electronic device over the period of time using the motion data generated by the IMU comprises computing a first estimated motion vector of the electronic device over the period of time, the first estimated motion vector comprising a first estimated direction of the electronic device over the period of time and a first estimated magnitude of the electronic device over the period of time;

the computing the second estimate of motion of the electronic device over the period of time using the images captured by the camera of the electronic device comprises computing a second estimated motion vector of the electronic device over the period of time, the second estimated motion vector comprising a second estimated direction and a second estimated magnitude; and the comparing comprises at least one of:

comparing the first estimated direction to the second estimated direction to determine the difference; or comparing the first estimated magnitude to the second estimated magnitude to determine the difference.

20. The system as recited in claim 13, wherein:

the computing the first estimate of motion of the electronic device over the period of time using the motion data generated by the IMU comprises computing a first estimated angular velocity of the electronic device over the period of time;

the computing the second estimate of motion of the electronic device over the period of time using the images captured by the camera of the electronic device comprises computing a second estimated angular velocity of the electronic device over the period of time; and the comparing comprises comparing the first estimated angular velocity to the second estimated angular velocity to determine the difference.

* * * * *